May 21, 1968  J. D. HARNDEN, JR., ET AL  3,384,888
OPTICAL APPARATUS
Filed Dec. 30, 1964  5 Sheets-Sheet 5

Inventors:
John D. Harnden, Jr.
Clifford M. Jones,
by Paul A. Frank
Their Attorney.

United States Patent Office 3,384,888
Patented May 21, 1968

3,384,888
OPTICAL APPARATUS
John D. Harnden, Jr., Schenectady, and Clifford M. Jones, Scotia, N.Y., assignors to General Electric Company, a corporation of New York
Filed Dec. 30, 1964, Ser. No. 422,227
12 Claims. (Cl. 340—339)

ABSTRACT OF THE DISCLOSURE

Solid state controlled conducting devices are connected in circuit relationship with lamps arranged in rows and columns on an electric display sign. A logic switching circuit controls the conduction states of the solid state devices and switches the conduction states column-by-column to obtain a traveling message defined by particular successively illuminated lamps in each row on the sign.

---

Our invention relates to a dynamic optical display, and in particular, to an illuminated display sign wherein the display presented on the sign may be of the moving or nonmoving type, and electronic circuitry employing all solid state devices is utilized to control the display.

Display signs of various types have been known for many years. Among the more well known types of signs are the moving (traveling) message sign, the nonmoving, but changing message sign such as the time-temperature signs most generally associated with banks, various scoreboards associated with sporting events, and finally the nonmoving sign which has a light dimming feature. All of the hereinabove mentioned signs may be employed indoor or outdoor, depending upon the particular application. In the case of outdoor signs, the preferred arrangement employs remote control of the sign whereby the sign is controlled from an indoor location protected from the elements of the weather. The controls for prior art display signs have been constructed from mechanical devices such as drums upon which are provided the particular logic comprising the characters to be presented on the display panel. Appropriate mechanical switching arrangements transform the logic stored on the mechanical drum to the desired sequential illumination of the lamps on the display panel.

The prior art mechanical approach to sign lamp control invariably results in the use of large interconnecting cables for supplying the logic to the display panel, the number of electrical conductors in the cable, in general, being at least equal to the number of lamps mounted on the display panel. Thus, for the larger type display signs a cable or cables comprising 1,000 or more electrical conductors is not unusual. In certain applications, it may not be possible to provide the magnitude of electrical power necessary to satisfy the impedance requirements of such electro-mechanical dynamic display. The mechanical drum arrangement also places a limitation on the versatility of the logic obtainable since the drum, or plurality of drums, become formidable structures with increasing complexity of the logic employed to obtain correspondingly complex optical patterns on the sign. The mechanical means for producing the logic and the attendant switching arrangements for converting the logic to the desired lamp illumination signals is a constant source of sign malfunction. Performance features which can be obtained with the mechanical arrangement are limited, even to the extent of not being able to stop a traveling sign in some applications.

The advent of electronic devices, and in particular, solid state semiconductor devices provides a significant opportunity to greatly improve display signs in both structure and operation. In particular, the use of solid state circuitry eliminates virtually all of the moving parts that are utilized in the present electro-mechanical control units thereby decreasing the frequency of repair and nonoperating time of the sign. Extension of lamp life is another advantage of solid state circuitry. The solid state circuitry also permits the use of a very small number of electrical conductors interconnecting the remote sign control system with the sign proper as opposed to the great plurality of conductors in the electro-mechanical system. Finally, solid state circuitry permits modes of sign operation which cannot be duplicated, or at best can only be duplicated with a great complexity of electro-mechanical components, such modes including the variation in speed of movement of the characters traveling across the sign, the stretching and compression of the characters on the sign, and variation in intensity of the lamps illuminated on the sign.

Therefore, one of the principal objects of our invention is to provide a new and improved electrical display wherein the lamps providing the illumination thereon are controlled by solid state semiconductor circuitry.

Another object of our invention is to provide a minimum number of electrical conductors for interconnecting a display sign with a remotely located sign control system.

A further object of our invention is to provide a display sign wherein the display thereon is of the moving or nonmoving but changing type.

Another object of our invention is to provide variation of the speed of travel of the characters across the display sign from a maximum speed to a complete stop in a finite or infinite number of increments.

A still further object of our invention is to provide the variation of speed of travel to thereby obtain the optical effect of stretching or compression of the characters.

Another object of our invention is to provide variation of lamp intensity from maximum brilliance to a dark condition, in any condition of character travel across the sign.

Briefly stated, and in accordance with our invention, we provide an illuminated display sign which includes a bank of electric lamps mounted in a desired arrangement of rows and columns on a display panel, and electronic circuitry which includes solid state controlled conducting devices for controlling the illumination of selected lamps on the display panels in a desired sequence (logic) to thereby obtain a desired presentation of a particular character or characters on the sign. A predetermined number of the lamps are employed to develop each of the characters display, and each of the lamps is connected in circuit relationship with an associated solid state device which, when in its conductive state, supplies electrical power to the associated lamp to cause illumination thereof. The particular state (conductive or nonconductive) of each solid state device is controlled by a first electronic circuit of the logic transfer type connected in circuit relationship therewith, the logic transfer circuits associated with each particular row of lamps being serially connected to form what is conventionally known in digital computer technology as a shift register circuit in a preferred embodiment of our invention.

The logic utilized by the logic transfer circuits is generated by an information circuit which converts input information into electrical pulse form corresponding to the desired sequence of lamp illumination, the output of the information circuit being connected in circuit relationship with the logic transfer circuits.

A second electronic circuit, having an output common to all of the logic transfer circuits, provides electrical signals for switching the logic from the logic transfer circuits associated with one column of lamps to the logic transfer circuits associated with the next successive column of lamps.

An electronic clock circuit is connected in circuit relationship with the second (logic switching) electronic circuit and generates electrical signals of pulse form at a substantially constant frequency for determining the speed of logic switching between logic transfer circuits associated with adjacent columns of lamps. The pulse output of the clock circuit may be varied in frequency for varying the speed of logic switching to thereby obtain variation of speed of travel of the characters across the entire length of display sign. Additional circuitry may be included in the clock circuit for changing the frequency of pulses by a predetermined ratio to thereby produce the optical effect of stretching or compression of the characters on the sign.

A lamp intensity control circuit having an output coupled to all of the logic transfer circuits provides an electrical signal for varying the intensity of the lamps from maximum brilliance to a dark condition.

The logic transfer circuits and logic switching circuits are preferably located on the display panel. The information circuit, clock circuit and lamp intensity control circuits are normally located remote from the display panel and are interconnected therewith by means of electrical conductors of number equal to the number of rows of lamps plus three for the basic display sign having a single speed of logic switching and lamp intensity control.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

Figure 1:
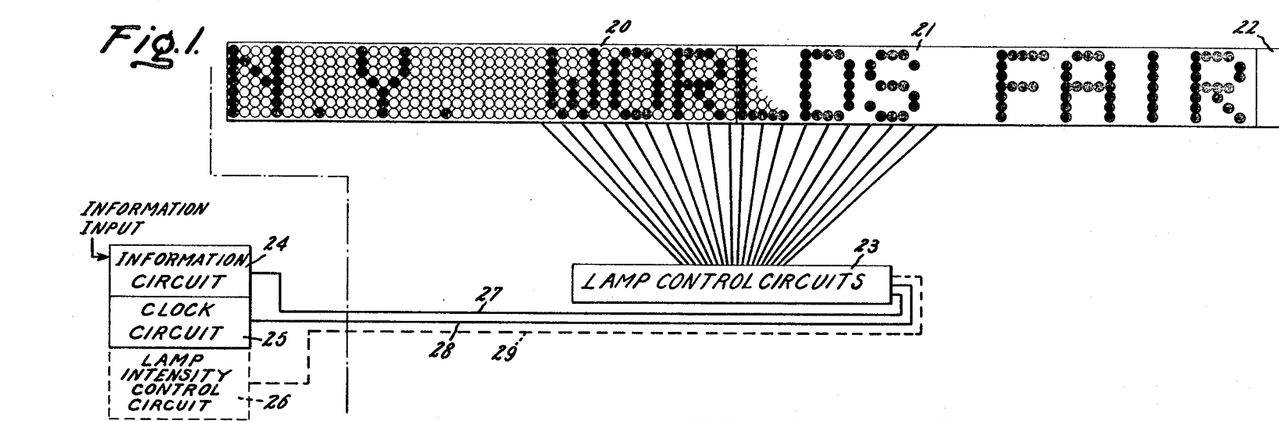
FIGURE 1 is a basic block diagram of a general illuminated dynamic optical, electrical display sign constructed in accordance with our invention.

Referring now to the simplified block diagram of FIGURE 1, there is shown a sign comprising a plurality of serially-connected display panel sections 20, 21 and 22 upon which are mounted a bank of predetermined number of lamps in a desired arrangement of rows and columns, the lamps being indicated by the circles on display panel section 20 and a portion of display panel section 21. The display presented on the sign may be a series of characters comprised by illuminated lamps against a dark background of nonilluminated lamps, or, alternatively, characters comprised by nonilluminated lamps against a background of illuminated lamps. The illumination of selected lamps on the signs is controlled by lamp control circuits 23 which are preferably mounted on the display panel in suitable enclosures for protection from the weather elements. The lamp control circuits 23 include a plurality of solid state controlled conducting devices which are connected in circuit relationship with the lamps in a manner to be described in detail hereinafter. The lamp control circuits selectively control the conduction of the solid state devices and thereby controllably supply electrical power to selected lamps in a desired sequence to cause illumination thereof and thereby obtain a desired display on the sign.

The display panel and associated lamp control circuits 23 may be located outdoor or indoor depending upon the particular application of the sign. However, whether the display panel and circuits 23 are located indoor or outdoor, the means for determining the desired characters on the display panel are, in general, contained within a control console located indoor and remote from the display panel. The control console or remote controller includes an information circuit 24 which converts an information input into prescribed electrical logic signals of pulse form corresponding to a desired sequence of lamp illumination. An electronic clock circuit 25 is an integral part of the remote controller and generates electrical pulses at a substantially constant frequency to thereby determine the speed of travel of the characters across the display panel. In the case wherein the sign merely provides a changing but not traveling or moving display, the clock circuit determines the speed at which the display may be changed on the sign. The circuits hereinabove briefly described comprise the basic components of the sign constructed in accordance with our invention. The basic components obtain a presentation on the display panel which may comprise letters, numbers, and any other desired pattern of illuminated and nonilluminated lamps as determined by the information input supplied to information circuit 24. The number of rows of lamps on the display panel are not limited to the height of a single number or letter, and thus several lines of a message may be presented simultaneously, or, the display may consist of an animated or nonmoving figure or design as determined by the information input. A lamp intensity control circuit 26 may be employed, if desired, to obtain control of lamp brightness on the sign from maximum brilliance to a dark condition in an infinite number of increments.

As previously mentioned, display panel sections 20, 21 and 22 and associated lamp control circuits 23 may be located indoor or outdoor depending upon the particular application, while information circuit 24, clock circuit 25 and lamp intensity control circuit 26 are, in general, located remote therefrom and indoor for protection from the weather elements. The number of interconnecting electrical conductors between the remote controller comprising circuits 24, 25 and 26 and the lamp control circuits 23 located at the display panel is a relatively small number in accordance with one aspect of our invention. Thus, the number of conductors 27 interconnecting information circuit 24 and lamp control circuits 23 is equal to the number of rows of lamps. A single electrical conductor 28 is required to interconnect clock circuit 25 and lamp control circuits 23 for a common speed of character travel across the display sign. A single electrical conductor 29 is also required to interconnect lamp intensity control circuit 26 and the lamp control circuits 23. A common signal return conductor is also employed but may be omitted in the presence of a satisfactory earth ground. It can be appreciated that a single conductor and multiplexing techniques, as well as wireless forms of communication, may be employed to interconnect the remote controller with the display panel. Parallel outputs may be provided from the output of information circuit 24 to operate more than one lamp control circuit such that several signs at different locations may be operated concurrently.

The display panel sections 20, 21 and 22 each preferably contain an equal number of lamps mounts thereon, although this is not a limitation. Each display panel section is of sufficient length to present one or a desired number of characters thereon. In many cases a single display panel section comprises the entire length of the sign. The decision to employ a single or plurality of panel sections is determined by many factors including the electrical power requirements per section. For exemplary purposes only, the sign in FIGURE 1 is illustrated as containing eight characters per display panel section, wherein each character is comprised by an arrangement of seven rows and five columns of lamps, and a sixth column being the separation between adjacent characters. It is evident that a greater or lesser number of rows and columns of lamps may be employed for each character, as desired.

Figure 2:
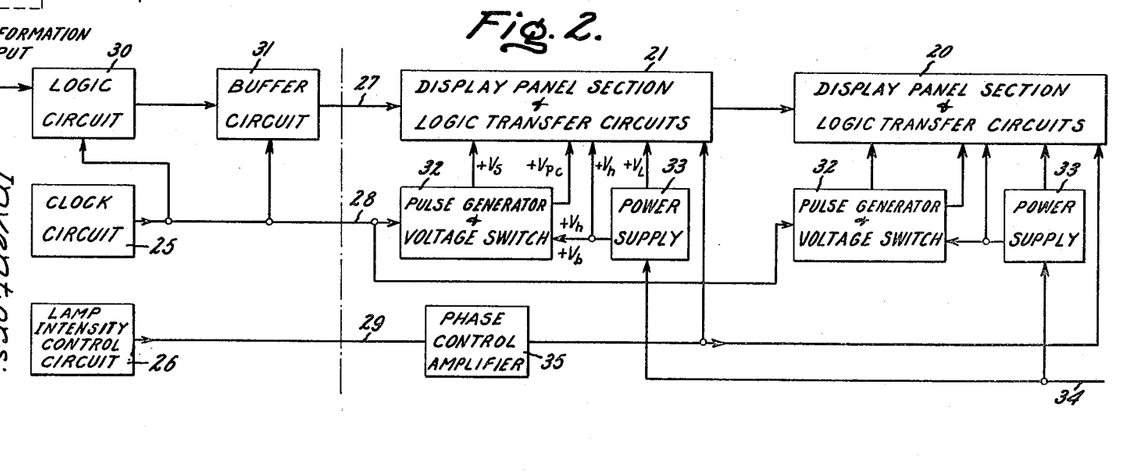
FIGURE 2 is a more detailed block diagram of the general display sign of FIGURE 1.

A more detailed block diagram of the sign illustrated in FIGURE 1 is shown in FIGURE 2 wherein the sign is limited in length to only two serially-connected display panel sections 20, 21. Each of these two display panel sections may be of the type hereinabove described having sufficient length to present eight characters thereon. The component designated lamp control circuits 23 in FIGURE 1 includes the following electronic circuitry illustrated in block diagram form in FIGURE 2; a plurality of logic transfer circuits for each display panel section, a power supply circuit 33 for each panel section, and a pulse generator and voltage switch circuit 32 for each panel section. As described hereinafter, each of the lamps on a display panel section is connected in circuit relationship with an associated solid state controlled conducting device which, in its conducting state, supplies electrical power to the associated lamp to cause illumination thereof. However, it is to be understood that more than one lamp may be concurrently supplied with power from a single solid state device. This, in the larger signs a cluster of perhaps four lamps, or a line of several lamps may be supplied from one solid state device.

The particular state (conductive or nonconductive) of each solid state device is controlled by one of the logic transfer circuits. The logic transfer circuits associated with each particular row of lamps on a display panel section are serially connected to form what is occasionally referred to in digital computer technology as a shift register circuit in a preferred embodiment of our invention. Thus, for the particular number of lamps per display panel section as illustrated in FIGURE 1 wherein there are 48 lamps per row and seven rows of lamps, seven shift register circuits each having 48 stages of logic transfer circuits therein are employed for each panel section.

The logic utilized by the logic transfer circuits (illustrated in FIGURE 2 as parts of display panel sections 20, 21) is supplied from the information circuit 24 of FIGURE 1 which is shown in greater detail in FIGURE 2 as components designated logic circuit 30 and buffer circuit 31 wherein logic circuit 30 converts input information into electrical pulse form corresponding to the desired sequence of lamp illumination, and buffer circut 31 provides a storage means for the logic generated in logic circuit 30. The input information is supplied on a suitable recording medium and may include various types of coded tapes including printed, punched or magnetic punched or printed cards, magnetic core storage, or film. The output of buffer circuit 31 is connected in circuit relationship with logic transfer circuits associated with the column of lamps on the extreme right end of the sign as viewed by an observer (last column of lamps on display panel 21), it being understood that the logic is transmitted in a direction from the last column of lamps on the last display panel section 21 to the first column on the first panel section 20 in order to obtain the conventional direction of message travel on the sign from right to left.

The electronic circuit designated pulse generator and voltage switch 32 has an output common to all of the logic transfer circuits associated with one of the display panels sections and provides electrical signals for switching the logic from the logic transfer circuits associated with one column of lamps to the logic transfer circuits associated with the next successive columns of lamps. Two outputs are provided from each of the pulse generator and voltage switch circuits 32 for purposes to be described in detail hereinafter. An output of clock circuit 25 is connected in circuit relationship with pulse generator and voltage switch 32 hereinafter also described as the logic switching circuit 32, and the frequency of the pulses generated by the clock circuit determines the speed of transmission of the logic through the logic transfer circuits and thus determines the speed of travel of characters across the display sign. A second output of the clock circuit is connected to logic circuit 30 and buffer circuit 31 to provide synchronization of the generated logic with the switching of the logic from one column of lamps to the next. The lamp intensity control circuit 26 also has an output common to all of the logic transfer circuits associated with each display panel section. One or more phase control amplifier circuits 35 may be employed at the display sign to amplify the lamp intensity control signal generated by component 26 in the remote controller. For exemplary purposes only, a single phase control amplifier 35 indicated, however, in many cases one such amplifier would be provided for each display panel section. Power supply circuit 33 provides electrical power to the various electronic components located on the display panel sections, and depending upon the circuitry associated with the solid state devices, power supply 33 may provide both alternating and direct current power. The power supply for the remote controller is not described herein since, in general, it comprises a conventional power supply circuit. Power supply 33 is supplied with alternating current electrical power from a single phase or one phase of a three phase circuit, the particular types of electrical conductors 34 supplying such power being determined by the power requirements of the various display panel sections.

Figures 3, 5:
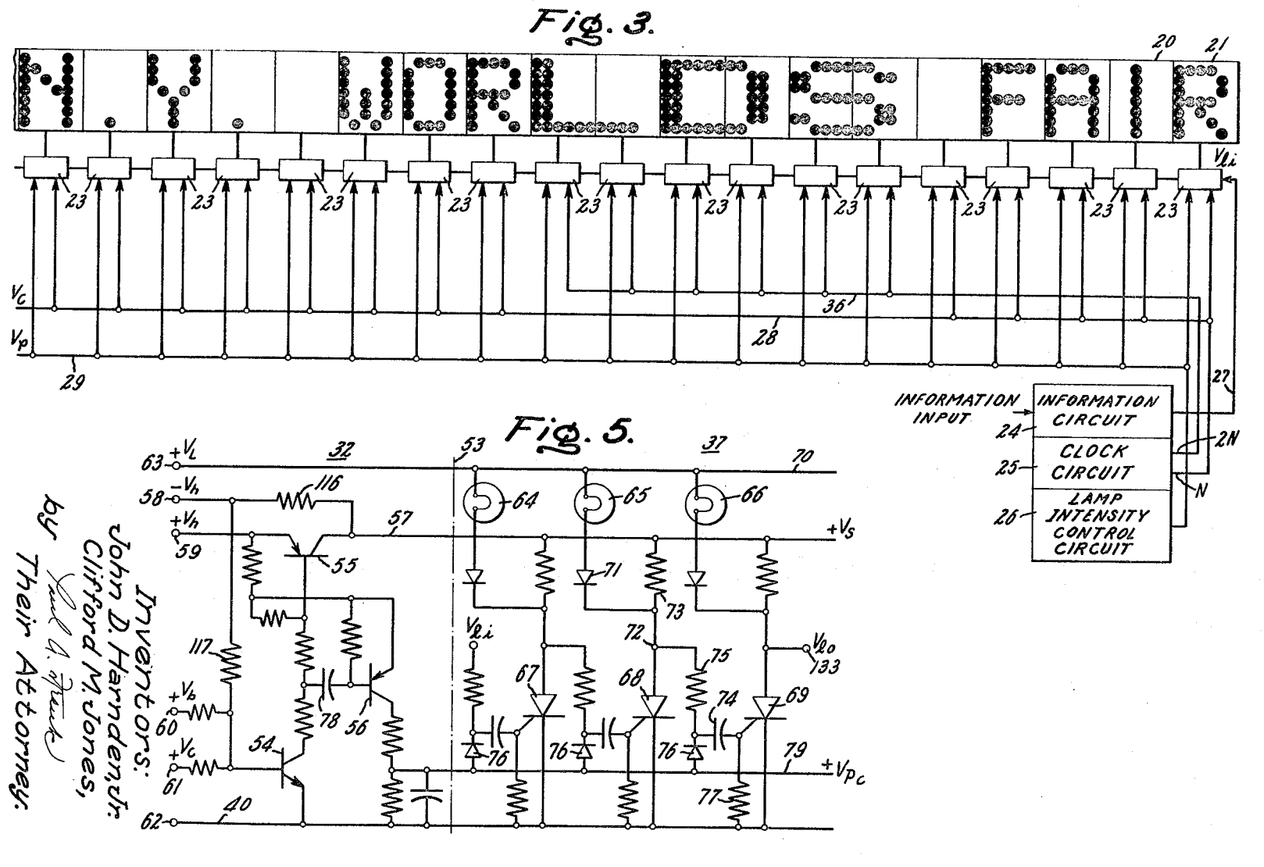
FIGURE 3 is a basic block diagram of a specific display sign constructed in accordance with our invention.
FIGURE 5 is a schematic diagram of the components designated as pulse generator and voltage switch and three stages of a logic transfer circuit shown in FIGURE 4 and constructed in accordance with our invention.

Referring now to FIGURE 3 there is shown a basic block diagram of a specific traveling message display sign of modular design which is similar to that shown in FIGURE 1. The specific dynamic optical display and components thereof shown in FIGURES 3 through 8 is the particular embodiment installed in the General Electric Pavilion at the 1964 New York World's Fair. In this World's Fair embodiment (hereinafter described as specific sign) there is one display panel section or module for each five lamp column character presented on the sign. As described herein above, a sixth column is provided for character separation.

In the specific embodiment of FIGURE 3, a plurality of lamp control circuits 23 are provided, one for each module. Clock circuit 25 is indicated as having two outputs for supplying two substantially constant but different frequencies of electrical pulses to determine two different speeds of logic switching from column to adjacent column of lamps. As illustrated in FIGURE 3, the first eight and the last five modules (counting from the left end of the sign as viewed by an observer) are supplied from electrical conductor 28 which is connected to a normal (n) speed output of clock circuit 25. The ninth through fourteenth modules are supplied from an electrical conductor 36 which supplies constant frequency pulses at twice the normal frequency (2 N) to obtain the optical stretching effect which is indicated for the letters LDS on the sign.

Figure 4:
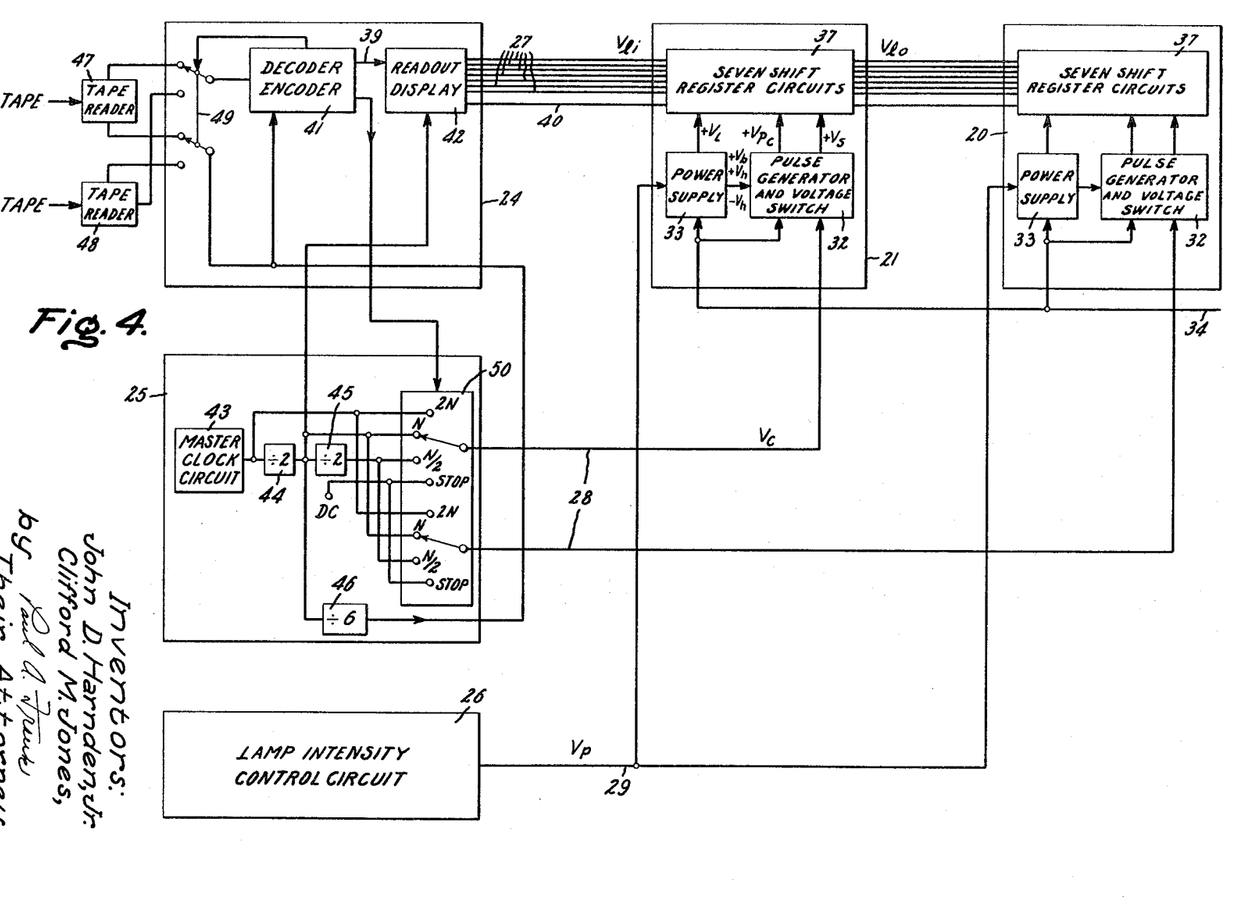
FIGURE 4 is a more detailed block diagram of the specific display sign of FIGURE 3.

A more detailed block diagram of the specific display sign illustrated in FIGURE 3 is shown in FIGURE 4 wherein only two modules 20, 21 are illustrated. The lamp control circuits 23 of FIGURE 3 are comprised of the same components as in FIGURE 2, that is, include a pulse generator and voltage switch (logic switching) 32 and power supply 33, each having outputs thereof connected to the logic transfer circuits 37 associated with the lamps on each respective module. The major distinctions between the lamp control circuits of FIGURES 2 and 4 are in the power supply 33 wherein the function of phase control amplifier 35 is incorporated within the power supply circuit 33 of FIGURE 4. Further, power supply 33 of FIGURE 4 has only one output common to all of the logic transfer circuits associated with one module as distinguished from the two outputs in FIGURE 2. These distinctions will be more evident in the hereinafter description of FIGURES 6 and 10. The logic transfer circuits 37 on each module are connected in circuit relationship to form seven shift register circuits, each shift register (logic transfer circuit) being six stages long corresponding to the circuit-associated six lamps per row. The output of information circuit 24 is connected to the stage of the seven shift register circuits associated with the column of lamps on the extreme right end of the sign as viewed by an observer by means of seven electrical conductors 27. For convenience of illustration only, an eighth conductor 40 which is a signal return or common ground is shown, although it is not necessarily associated only with the logic transfer circuits, and as mentioned hereinabove, may be omitted in some instances. Eight electrical conductors are also shown for interconnecting the shift register circuits of display panel sections 21 and 20.

In the specific sign of FIGURE 4, the characters to be displayed are encoded on tape by means of 7 bit punched holes, and the sequence of punched holes are detected by a conventional tape reader. Information circuit 24 includes a decoder-encoder 41 which may be of conventional design (such as a diode matrix, resistor matrix, or magnetic core) for decoding the 7 bit encoded characters on the tape to one of 53 unique outputs. The encoder then converts the single unique decoder output to a selected combination of 42 outputs used by a readout display and the logic transfer circuits. The interconnection between the tape reader and decoder-encoder comprises 8 electrical conductors. A readout display 42 is employed to temporarily store the information decoded by decoder-encoder 41. Readabout display 42 is connected to the output of decoder-encoder 41 and comprises the lamp control circuits 23 of one module. The lamps may be omitted from the readout display logic transfer circuits, or, alternatively, may be included to produce an optical display of each particular character prior to its transfer and display on the remote sign. A plurality of forty-three electrical conductors 39 (seven rows, six columns, and one common) interconnect decoder-encoder 41 and readout display 42, each of the forty-two logic transfer circuits in readout display 42 being connected to a respective output of decoder-encoder 41.

Two tape readers 47, 48 are preferably employed in our invention, a first of the readers 47 being utilized to provide conventional or recurring messages and the second reader 48 providing unusual or nonrecurring messages such as instant news bulletins. A switch 49 which is preferably of the electronic type or electromagnetic type is actuated by a suitable tape reader switching signal encoded on the tape. Thus, an output of decoder-encoder 41 determines the time of switching from one tape reader to the other.

Figure 7:
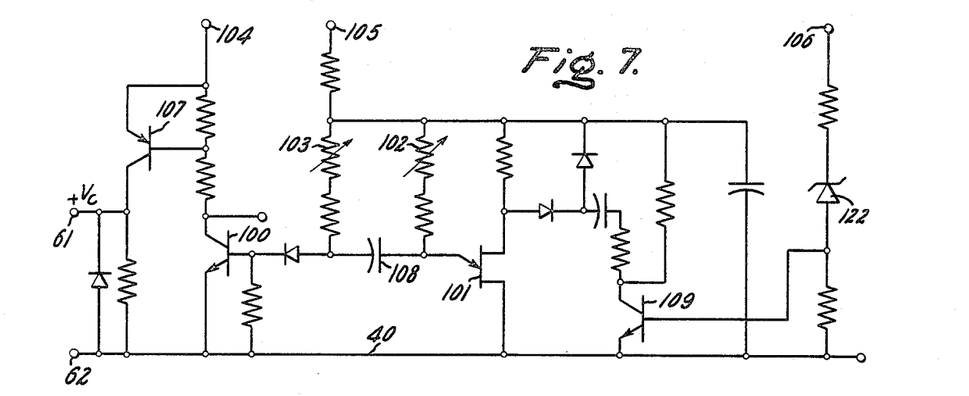
FIGURE 7 is a schematic diagram of the component designated as master clock circuit in FIGURE 4.

Clock circuit 25 comprises a master clock circuit 43 shown in schematic detail in FIGURE 7 for generating electrical pulses at a substantially constant frequency of 2 N, the frequency N being in a range of 0–60 pulses per second. A convenient operating frequency is 20 pulses per second. A first electronic bistable circuit 44 provides a frequency division to convert the 2 N frequency pulses to pulses of frequency N, and a second electronic bistable circuit 45 provides a frequency division to further convert the pulses to a frequency of N/2. A third electronic bistable circuit 46 provides a frequency division to divide the N frequency by six and supply pulses of N/6 frequency to information circuit 24. The electronic bistable circuits hereinabove described may comprise conventional flip-flop circuits. The 2 N frequency output of master clock circuit 43 obtains double-normal speed of logic switching (character movement in the case of the traveling message sign), the N frequency output of divider 44 obtains normal speed, the N/2 frequency output of divider 45 obtains half-normal speed, and a direct current source (DC) obtains a stopping of the displayed characters. The choice of speeds for each of the modules is determined by switch 50 which should be of the fast operating type, and is actuated by a suitable speed control signal encoded on the tape. Switch 50, as switch 49, may be an electronic type switch or electromagnetic.

The operation of the electrical display sign illustrated in FIGURES 3 and 4 will now be described. A message desired to be presented as a traveling message on the display sign is encoded on the tape. The encoded message is detected on the tape by one of tape readers 47 and 48. Tape readers 47, 48 and decoder-encoder 41 operate at N/6 speed for the case of encoded tape (having six columns per character whereas readout display 42 steps six times per character (once for each column of lamps). In the case of real time tape wherein the bits of information can be read directly as the desired character, the tape reader and decoder-encoder operate at N speed. The output of decoder-encoder 41 is provided simultaneously to all of the corresponding logic transfer circuits within readout display 42 by means of the interconnecting forty-three electrical conductors 39. The logic comprising a particular character produced within readout display 42 (the conductive and nonconductive state of the solid state devices within the logic transfer circuits) is stored therein and serially transferred to the sign by the time the tape reader steps again to produce the next character. Readout display 42 operates at normal N speed only and transfers the logic stored therein to the remotely located display sign, the logic being switched, column by column, to the logic transfer circuits associated with the column of lamps on the extreme right end of the sign as viewed by an observer. The sign pulse generator and voltage switch circuits 32 switch the logic from column to column on the display sign in accordance with the logic stored in readout display 42. Thus, assuming that each of the logic switching circuits 32 is operating at normal N speed, the characters sequentially stored within readout dsplay 42 are obtained optically on the display sign and are seen by an observer as coming in from the right end of the sign and moving in a direction toward the left end thereof. At such normal N speed, the characters presented on the display sign are of normal (single) width such as the letters N.Y. shown in FIGURE 3. The normal N speed can be varied by an adjustment in the master clock circuit 43 as will be evident in the hereinafter description of FIGURE 7. Thus, the speed of movement of the message across the display sign can be changed, within limits, as determined by the master clock circuit 43. This variation of speed of travel by adjustment of the master clock circuit is, of course, applicable to the entire length of the sign and maintains each of the characters at its normal width of five columns of lamps.

The width of characters presented along selected lengths or the entre length of the display sign may be altered to obtain the optical effect of stretching and/or compression of the characters by changing the frequency of clock circuit pulses supplied to the pulse generator and voltage switch 32 in a predetermined ratio. Stretching is obtained by a frequency increase from normal N frequency to double-normal 2 N frequency as determined by suitable actuation of switch 50. Thus, assuming that selected modules are provided with logic switching pulses of double-normal 2 N frequency, and the remaining modules are supplied with normal N frequency pulses, the modules supplied with the 2 N frequency obtain the optical effect of stretching as illustrated by the letters LDS on FIGURE 3. It should be understood that all of the letters on the sign may be stretched concurrently to double width by supplying the 2 N frequency pulses concurrently to all of the modules. The character width can be further increased by providing block circuit pulses having correspondingly higher frequencies such as 3 N (triple width) and 4 N (quadruple width). In like manner, the optical effect of compression of the characters is obtained by a frequency decrease of the clock circuit pulses. Thus, assuming that N frequency produces characters of double-normal width, changing the frequency to $N/2$ by means of switch 50 compresses the characters to normal width.

The light output of the lamps illuminated on the display sign may be varied from maximum brillance to a dark condition by an adjustment in lamp intensity control 26 as indicated in the hereinafter description of FIGURE 8. In the specific display illustrated in FIGURES 3 through 8, the lamp intensity control is shown to govern the intensity of all of the lamps on the two modules 20, 21 of the display sign concurrently. The complete sign of FIGURES 3 and 4 includes 120 modules, and a plurality of lamp intensity controls are provided to obtain a desired lighting effect on the sign. In addition to obtaining the desired lighting effect (accenting specific words or portions of the sign with greater or lesser lamp intensity), at least one lamp intensity control is needed for each phase of a polyphase power system supplying the electrical energy to the sign.

The traveling message sign hereinabove described may also be utilized as a changing sign, that is, a sign wherein the characters do not move thereacross but are fixed in position and can be changed. Examples of the latter type of sign are the time-temperature signs most generally associated with banks, and various scoreboards associated with sporting events such as baseball and horse racing. The message is encoded on the tape and goes through the same process in information circuit 24 and is thence transferred to the display sign, however, the lamp intensity control 26 is controlled in synchronism with the transfer of the message from information circuit 24 to the remote display sign such that all of the lamps on the sign are maintained in a dark condition during the interval of message transfer. Upon the complete message being obtained on the sign, decoder-encoder 41 instructs speed switch 50 in clock circuit 25 to switch to the stop position, thereby stopping the movement of characters on the display sign, and lamp intensity control 26 is simultaneously controlled to obtain the desired brilliance of lamp intensity on the sign. Thus, the optical effect as viewed by an observer is that of a sudden presentation of a complete message which may occupy the entire length of the display sign, then a short time interval of no message, followed by another presentation of a complete message which may be identical to the first or changed therefrom in a predetermined manner.

Figures 9, 10, 12:
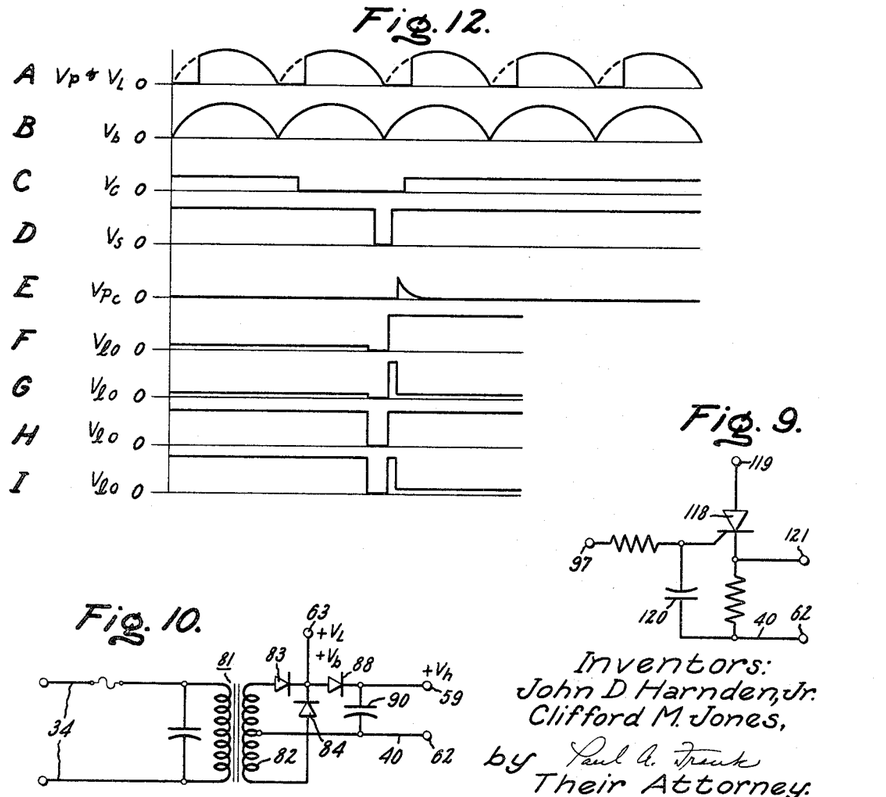
FIGURE 9 is a schematic diagram of the component designated as phase control amplifier in FIGURE 2.
FIGURE 10 is a schematic diagram of a second embodiment of a power supply which may be employed in our invention.
FIGURE 12 illustrates the waveforms of various voltages identified in the circuitry of the display sign.

The specific components generally described hereinabove in block diagram form will now be described in detail. Referring to FIGURE 5, there is illustrated a schematic diagram of the component designated as pulse generator and voltage switch in FIGURE 4 and three stages of one row of the logic transfer circuits (shift register circuits) 37 constructed in accordance with our invention. Pulse generator and voltage switch circuit 32 is connected in circuit relationship with the three serially-connected stages of logic transfer circuits 37 and separated therefrom by means of dashed line 53. Pulse generator and voltage switch 32 is comprised of transistor 54 connected in an AND logic circuit, and transistor 55 connected in a circuit for obtaining a voltage switching function. Transistor 55 must provide and interrupt only the holding current for the solid state devices 67, 68, 69 which is orders of magnitude less than the load current flowing through the lamps 64, 65, 66, thus transistor 55 is a relatively low power level device. A third circuit including transistor 56 provides a pulse generating function. The input voltages to pulse generator and voltage switch circuit 32 includes two full wave rectified, filtered voltages, that is, D.C. voltages $-V_h$ and $+V_h$, a full wave rectified, unfiltered voltage $+V_b$ supplied from the power supply circuit of FIGURE 6, and the output from clock circuit 25 designated $+V_c$. The clock circuit output voltage $+V_c$ is a D.C. voltage which periodically switches to zero for the time interval of one of the clock pulses which by way of example is in the order of 8 milliseconds. Reference to FIGURE 12 more clearly illustrates the waveforms of these voltages, and also illustrates the sequence of operation to be hereinafter described. Voltage $+V_b$ and clock circuit output voltage $+V_c$ are supplied at terminals 60 and 61, respectively, and are both applied to the base electrode of adder circuit transistor 54. Voltages $-V_h$ and $+V_h$ are supplied at terminals 58 and 59, respectively, and are connected in circuit relationship with the collector and emitter electrodes, respectively, of transistor 55. A switched voltage common buss 57 is connected to the collector electrode of transistor 55. The presence or absence of the switched voltage $+V_S$ on buss 57 is determined by the mode of operation of transistor 55, that is, transistor 55 switches voltage $+V_h$ to buss 57 when in its conductive state, and does not switch the voltage in its nonconductive state. Resistor 116 connected between terminal 58 and collector electrode of transistor 55 assures that the switched voltage $+V_S$ becomes zero when transistor 55 is nonconductive. Resistor 117 connected between terminal 58 and base electrode of transistor 54 assures reliable switching.

The operation of voltage switch and pulse generator circuit 32 will now be described with reference to FIGURE 5 and the waveforms of FIGURE 12. During the time interval in which a nonzero voltage $+V_c$ is applied to terminal 61 (in the absence of a pulse generated by clock circuit 25), transistor 54 is in a fully conductive state, and transistor 55 is therefore also in a fully conductive state whereby switched voltage $+V_S$ is present on switched voltage common buss 57. Switched voltage $+V_S$ remains on buss 57 until such time that voltages $+V_b$ and $+V_c$ are concurrently at (or near) zero. Thus, as seen in FIGURES 12B, C, D, during a clock circuit pulse wherein $+V_c$ and $+V_b$ becomes near zero, the voltage $+V_S$ on buss 57 switches to zero and remains at zero during the time when voltage $+V_b$ is near zero crossing. Only one such zero crossing will occur in the approximate 8 milliseconds duration of a clock pulse for a one to three phase 60 cycle power system. At such power system zero-crossing time, transistor 54 and also transistor 55, are in a nonconductive state.

As hereinabove described, character width is varied by varying the repetition rate (frequency N, 2 N, etc.) of the clock pulse $V_c$. An alternate method for varying character width is to lengthen the clock pulse $V_c$ to permit more than one power system zero crossing during the duration of a clock pulse. Thus, permitting two zero crossings (of voltage $+V_b$) during the time of one clock pulse $V_c$ by varying resistor 103 in FIGURE 7 obtains double character width. This latter technique obtains variation of character width without employing additional $V_c$ interconnecting conductors 28, 36 for selected portions of the sign as necessary in the first method.

Three stages of serially-connected lamp transfer circuits are illustrated in FIGURE 5 wherein lamps 64, 65 and 66 are successive lamps in one row and are each connected in circuit relationship with a corresponding solid state controlled conducting device 67, 68 and 69, respectively. Solid state devices 67, 68 and 69 may be conventional gate turn-on, nongate turn-off silicon controlled rectifiers, or, may comprise the more recently developed gate turn-on, nongate turn-off bidirectional controlled conducting devices such as triac, as one example. Alternatively, non-gate turn-on controlled conducting devices such as the $dv/dt$ fired silicon controlled rectifier or a bidirectional conducting device called the diac may be employed by utilizing a suitable pulse transformer for impressing a turn-on firing pulse across the nongate turn-on device. It is recognized that line commutation is normally used for the above-described solid state devices, 67, 68, 69 in display signs since alternating current voltage is available, it is the simplest mode of commutation, and the fewest elements are necessary therefor. Forced commutation, however, as widely described in the literature, permits independent control of turn-on and turn-off of the solid state devices, thus providing additional display opportunities as well as increased speed of logic transfer. Gate turn-off devices such as a GTO silicon controlled rectifier or multigate silicon controlled rectifier may be employed to advantage in forced commutation circuits since with such devices forced commutation is much more feasible due to the inherent gain in the turn-off mode. The solid state devices 67, 68 and 69 illustrated in the circuit of FIGURE 5 are employed to carry both the logic and lamp power for the associated lamps. Thus, during the conduction interval of solid state device 68, a D.C. current flows from lamp common buss 70 being supplied at terminal 63 with voltage $V_L$, through lamp 65, blocking diode 71, and solid state device 68 to a common ground or signal return conductor 40 connected to terminal 62 maintained at zero volts. Lamp voltage $+V_L$ is a full wave rectified, unfiltered, phase controlled voltage supplied from the power supply circuit 33.

The operation of the logic transfer circuits 37 will now be described for the case wherein the logic commands that the nonilluminated state of a particular lamp be transferred to the next subsequent lamp in the same row of lamps. Assume that solid state device 68 is nonconductive whereby associated lamp 65 is nonilluminated and such logic is to be transferred to the next subsequent logic transfer circuit which includes lamp 66 and solid state device 69. At steady state conditions, the anode (terminal 72) of solid state device 68 is at the switched voltage $+V_S$ since there is no voltage drop across resistor 73 which interconnects the switched voltage common buss 57 and the anode of solid state device 68. The portion of the logic transfer circuit which interconnects solid state devices 68 and 69 includes resistor 75 connected at terminal 72, diode 76, capacitor 74 connected to the gate of solid state device 69, and resistor 77 connected between ground buss 40 and the junction of capacitor 74 and the gate of device 69. During the steady-state condition wherein solid state device 68 is nonconductive and no clock pulse is supplied to terminal 61, capacitor 74 becomes charged through resistors 73, 75 and 77 to the voltage $V_s$ which is approximately 20 volts. Now, assume that a clock pulse is supplied to terminal 61, that is, voltage $+V_C$ switches to zero and remains at zero for approximately 8 milliseconds. This 8 millisecond interval is of sufficient duration to insure that only one zero crossing of voltage $+V_b$, regardless of power system phase, occurs during the clock pulse. The concurrent presence of the clock pulse and zero crossing of voltage $+V_b$ renders transistor 54 nonconductive and thus also causes transistor 55 to become nonconductive. The switching of transistor 55 from a conductive to a nonconductive state automatically switches voltage $+V_S$ on switched voltage common buss 57 to zero and during this short interval of time which may be in the order of 100 microseconds (the total time for transferring the logic), all of the solid state devices 67, 68, 69 in the logic transfer circuits are fully commutated off. Voltage $+V_b$, being of full wave rectified, unfiltered wave form begins to rise in a positive direction after falling to zero to cause transistor 54 to become conductive, and, in like manner causes transistor 55 to become conductive thereby reapplying voltage $+V_S$ to the switched voltage common buss 57. At this time all of the solid state devices 67, 68 and 69 are in a nonconducting state and transistor 56 is momentarily rendered conductive through capacitor 78 connected to the base electrode thereof. The momentary conduction of transistor 56 generates a voltage pulse $+V_{PC}$ on pulse common buss 79 connected in the collector electrode circuit of transistor 56. The voltage pulse $+V_{CP}$ appears on pulse common buss 79, however, since capacitor 74 maintains its charge during the short duration of pulse $V_{PC}$, diode 76 remains reversed biased (since capacitor 74 is charged to $V_S$ and pulse $V_{PC}$ is less than $V_S$, thus no gate current is supplied to solid state device 69 and it therefore remains nonconductive. Thus, the logic has been transferred from the circuit including lamp 65 and solid state device 68 to the circuit including lamp 66 and solid state device 69 during the time of pulse $V_{PC}$. The nonconductive state of device 69 prevents the flow of electrical power to lamp 66 and thereby maintains it in a nonilluminated condition in accordance with the logic transferred to such circuit. The terminal 72 connected to the anode of device 68 is the logic input $V_{Ii}$ point to the third stage of logic transfer circuitry (and also the logic output $V_{Io}$ point for the second stage). Terminal 133 is the logic output $V_{Io}$ point of the third stage. It should be evident from FIGURE 5 and the hereinabove description with reference to the one row of lamps 64, 65, 66, that the one voltage switch and pulse generator circuit 32 is also employed with each of the second through seventh rows of lamps associated with one display panel section or module.

The operation of the logic transfer circuit will now be described in the case wherein the illuminated state of a lamp is to be transferred to the next subsequent lamp in the same row. Assume that solid state device 68 is conducting and associated lamp 65 is therefore supplied with electrical power and is in an illuminated condition. At this time, the anode of device 68, terminal 72, is at a voltage of approximately 1 volt, the voltage drop across conducting solid state device 68. Under these conditions, capacitor 74 is charged to the voltage of the anode of device 68, that is, to approximately 1 volt. The sequence of operation of the pulse generator and voltage switching circuit 32 and the logic transfer circuits 37 is the same as in the nonilluminated logic transfer case hereinabove described through the step wherein transistor 56 momentarily becomes conducting and generates voltage pulse $V_{PC}$ on pulse common buss 79. At this time, the diode 76 connected in circuit relationship with the gate of solid state device 69 becomes conductive since the pulse generated on pulse common buss 79 has a peak voltage of approximately 10 volts as compared to the one volt charge on capacitor 74. The conduction of diode 76 causes a current flow through capacitor 74 to the gate of solid state device 69 thereby causing such device to become conductive. The conduction of device 69 completes a very low resistance path for lamp 66 between the lamp common buss 70 and the common ground 40. Thus, it can be seen that the logic has been transferred from the circuit including lamp 65 and device 68 to the circuit including lamp 66 and device 69 for the illuminated lamp case. It thus follows that capacitor 74 is charged in its steady state condition (the interval between logic transfer) to a voltage of approximately 1 volt if the previous stage is "on" (lamp illuminated) and is charged to switch voltage $V_s$ of approximately 20 volts if the previous stage is "off" (lamp not illuminated). The logic signal is supplied from readout display 42 to the logic input $V_{Ii}$ terminal of the first stage of logic transfer circuitry. The logic signal is transferred from the third stage at logic output $V_{Io}$ terminal 133. The waveforms of the logic signal $V_{Io}$ (and $V_{Ii}$) are illustrated in FIGURES 12F, G, H, I wherein FIGURE 12G illustrates the case of a stage being "on" and commanded to stay "on," FIGURE 12F the case of a stage being "on" and commanded to turn "off," FIGURE 12H the case of a stage being "off" and commanded to stay "off," and FIGURE 12I the case of a stage being "off" and commanded to turn "on."

Characters of normal (single) width are obtained on the display sign when the information circuit 24 and logic switching circuits 32 are each operated at normal N frequency. However, operation of the logic switching circuits 32 at double-normal 2 N frequency (by means of switch 50) obtains double width characters since the information circuit operates only at normal frequency, thereby causing two switchings (and transfers) of logic during the interval of each logic signal obtained from readout display 42.

Figure 6:
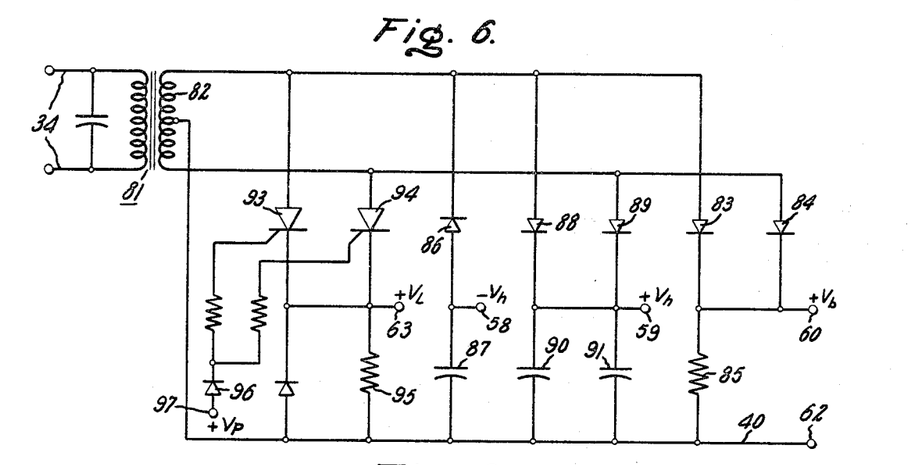
FIGURE 6 is a schematic diagram of the component designated as power supply in FIGURE 4.

FIGURE 6 is a schematic diagram of the component designated power supply 33 in the specific sign of FIGURE 4. The power supply circuit is supplied alternating current electrical power from a single phase or one phase of a three phase circuit, the particular types of electrical conductors 34 supplying such power being determined by the power requirements of the display sign. Power transformer 81 reduces the voltage of the incoming power to 15 volts on the secondary winding 82 thereof. The power supply circuit is of conventional design and includes a plurality of diode rectifiers connected in circuit relationship to obtain voltages having desired wave forms. Thus, rectifying diodes 83 and 84 are connected across the secondary winding 82 of the power transformer and a full wave rectified, unfiltered voltage $+V_b$ is developed across resistor 85 and made available across terminals 60, 62 which are correspondingly numbered in FIGURE 5. Diode 86 is connected in series circuit relationship with filter capacitor 87 across one half of the secondary winding 82 to develop the direct current voltage $-V_h$ across capacitor 87 and made available across terminals 58, 62. Diodes 88 and 89 are connected in circuit relationship with filter capacitors 90, 91 across the secondary winding 82 of transformer 81 to develop the direct current voltage $+V_h$ made available across terminals 59, 62. The lamp voltage, full wave rectified, phase controlled voltage $+V_L$, is developed across terminals 63, 62 by a pair of silicon controlled rectifiers 93 and 94 connected across the secondary winding 82 of transformer 81. The full wave rectified voltage developed across resistor 95 is phase controlled by controlling the phase of firing (initiation of conduction) of controlled rectifiers 93, 94 with a voltage $+V_p$ supplied to the gate electrodes thereof. The gate control voltage $+V_p$ is the output of lamp intensity control circuit 26 and is supplied to the gate electrodes of controlled rectifiers 93, 94 through blocking diode 96 at terminal 97. Peak values of each of voltage $V_L$ and $V_p$ are approximately 20 volts.

FIGURE 7 is a schematic diagram of the component designated master clock circuit 43 in the specific sign shown in FIGURE 4. The master clock circuit is a conventional clock pulse generator circuit adapted to supply a pulsed output at a substantially constant and predetermined frequency. The clock pulse generator circuit includes transistor 100 and unijunction transistor 101 connected in a conventional multivibrator circuit wherein adjustable resistor 102 determines the repetition rate of the pulses generated by the multivibrator circuit and variable resistor 103 determines the pulse width. Thus, both the on and off times of the pulses generated by the multivibrator circuit are adjustable. Terminals 104 and 105 are connected to sources of direct current voltage wherein such source is a conventional power supply located at the remote controller. A full wave rectified, unfiltered voltage is supplied to the clock circuit at terminal 106. The voltage $V_c$ generated across terminals 61, 62, is normally at $+4$ volts when transistors 107 and 100 are both conducting and at such time there can be no logic transfer on the sign. The off-time of each clock pulse (time at $+4$ volts) is determined primarily by the RC time constant of resistor 102 and capacitor 108. The operation of the clock circuit may be briefly described as follows. When capacitor 108 is charged to the trip point of unijunction transistor 101, such transistor switches to its conductive state thereby rendering transistors 100 and 107 nonconductive for a time determined primarily by the RC time constant of resistor 103 and capacitor 108. The absence of conduction of transistors 100 and 107 causes clock circuit output $V_c$ to switch to zero volts and remain at zero for the time constant of resistor 103 and capacitor 108. The on-time of the clock pulse generator circuit, that is, the time interval at which the voltage $V_c$ is at zero in the order of 8 milliseconds and is usually smaller than the time at which the voltage is at its normal value of 4 volts. Transistor 109 and Zener diode 122 are employed in a conventional circuit to synchronize the switching of unijunction transistor 101 with the line voltage zero crossings obtained at terminal 106.

Figure 8:
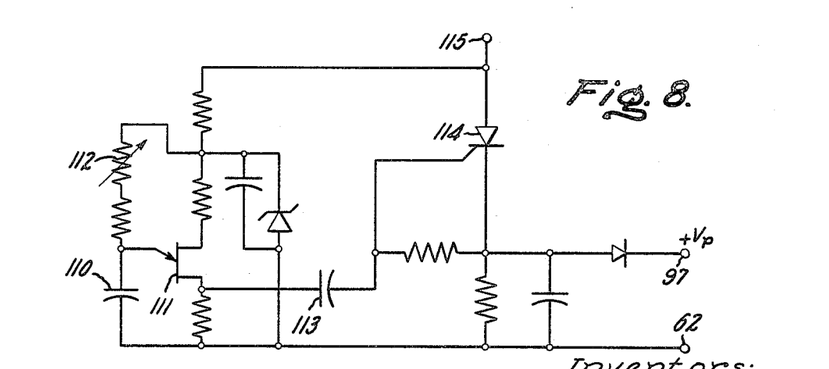
FIGURE 8 is a schematic diagram of the component designated as lamp intensity control in FIGURE 4.

FIGURE 8 is a schematic diagram of the component designated as lamp intensity control 26 in the specific sign of FIGURE 4. Lamp intensity control circuit 26 is a conventional circuit wherein a capacitor 110 is charged to the trip voltage of unijunction transistor 111 through variable resistor 112. Upon capacitor 110 reaching the trip voltage, unijunction transistor 111 is switched into its conductive state and capacitor 110 discharges through capacitor 113 to gate on silicon controlled rectifier 114 to render it conducting and thereby develop a phase controlled output voltage $+V_p$ across terminals 97, 62. A full wave rectified, unfiltered voltage is supplied to the circuit at terminal 115. The time from the zero crossing of the full wave rectified voltage to the time at which the lamp intensity control signal $V_p$ is developed across terminals 97, 62 may be varied by varying resistor 112. Thus, resistor 112 controls the phase controlled lamp buss common voltage $V_L$. Increasing the resistance of resistor 112 increases the time until controlled rectifier 114 is switched to its conducting state and thereby decreases the "on" time of the voltage pulse $V_p$. Unijunction transistor 111 is self-resetting in that when the current supplied by capacitor 110 falls below the holding current level of the conjunction transistor, it automatically becomes nonconducting. Controlled rectifier 114 resets itself to a nonconducting state when the line voltage supplied at terminal 115 falls to a zero crossing. The ability to change lamp intensity does not hamper the logic transfer, thus, dark (invisible) writing is possible to produce the changing (nonmoving) sign as well as many other unusual effects. Since the switching and transfer of logic has occurred at or near the zero crossing of $+V_p$ and $+V_L$, as seen in FIGURE 12A, a minimum deterioration of the lamp filament occurs, thereby increasing lamp life as compared to conventional methods of switch closure. The system is normally operated with a minimum phase shift in $+V_p$ and $+V_L$. Operation with large phase shift should include conventional "soft-start circuits" for effectively limiting the lamp current inrush. The circuit of FIGURE 8 is also used to set the maximum allowable lamp intensity to maximize lamp life.

The lamp intensity control can be automated by incorporating suitable light detectors in the emitter firing circuit of the unijunction transistor 111 whereby lamp intensity control is provided as a function of any ambient condition experienced by the detector. This is desirable since a greater lamp intensity is required in the daytime as compared to nighttime to have the same sign readability, thereby providing an economy in power consumption and further increasing lamp life.

Automatic programming of light intensity in response to appropriate commands from the information input is easily incorporated by known methods to provide interesting optical effects. Thus, step changes or smooth changes in light intensity can be provided.

In the case of polyphase power system operation, frequently encountered in large load installations, a separate lamp intensity control circuit 26 is provided for each phase and when properly referenced, allows smooth transition to the human eye of the display movement in the case of traveling message signs.

FIGURE 9 is a schematic diagram of the component designated as phase control amplifier 35 in the general embodiment of the sign illustrated in FIGURE 2. The amplifier is a conventional circuit comprising a silicon controlled rectifier 118 having its anode connected to a source of full wave rectified voltage at terminal 119. The lamp intensity control signal $V_p$ which is generated by the circuit illustrated in FIGURE 8 is supplied to the gate circuit of controlled rectifier 118 at terminal 97. Capacitor 120 connected between the gate electrode and common signal return or ground conductor 40 is a high frequency filter. The voltage developed across terminals 121, 62 is an amplified voltage $V_p$ having the same wave form as voltage $V_p$ applied at terminals 97.

FIGURE 10 is a schematic diagram of a second embodiment of the component designated as power supply 33 which may be employed in the more general display sign illustrated in FIGURE 2. The power supply circuit of FIGURE 10 is similar to the power supply circuit of FIGURE 6 in that rectifying diodes 83, 84 are connected across the secondary winding 82 of transformer 81 to provide a full wave rectified, unfiltered voltage $+V_b$ across terminals 63, 62. A direct current voltage $+V_h$ is developed across filter capacitor 90 and is available at terminals 59, 62. The major distinction between the power supply circuits of FIGURES 6 and 10 is that a full wave rectified, but not phase controlled, lamp buss common voltage $V_L$ is obtained at terminals 63, 62 whereas in the power supply circuit of FIGURE 6, $V_L$ is a full wave rectified, phase controlled voltage. The power supply circuit of FIGURE 10 also has no provision for developing a negative direct current voltage $-V_h$ as in the case of FIGURE 6.

Figure 11:
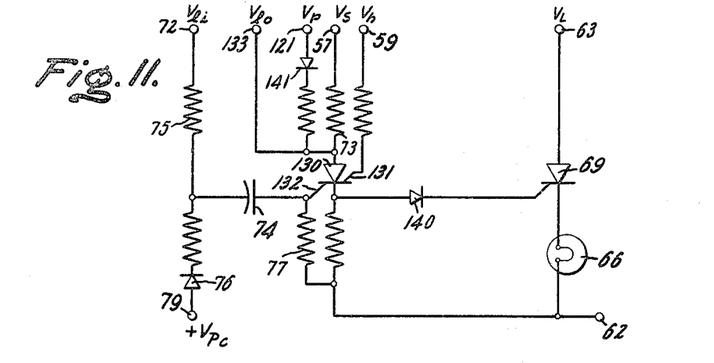
FIGURE 11 is a schematic diagram of a second embodiment of one stage of logic transfer circuitry which is constructed in accordance with our invention.

FIGURE 11 is a schematic diagram of a second embodiment of one stage of logic transfer circuitry which is constructed in accordance with our invention and may be employed in the general embodiment of the sign illustrated in FIGURE 2. The logic transfer circuit of FIGURE 11 may appropriately be employed with a power supply circuit of the type shown in FIGURE 10. The major distinction between the logic transfer circuit of FIGURE 5 and that of FIGURE 11 is the fact that the logic and lamp current are both carried by the solid state controlled conducting devices 67, 68, 69 in FIGURE 5 whereas only the lamp current is carried by the solid state controlled conducting device 69 of FIGURE 11. In the FIGURE 11 circuit, a second solid state controlled conducting device 130 known as a silicon controlled switch is employed to carry the logic. Device 130 is provided with an anode gate 131 and a cathode gate 132. The anode gate circuit is connected to the positive D.C. voltage $+V_h$ obtained from the power supply circuit of FIGURE 10 at terminal 59. The cathode gate circuit is connected to the pulse common buss voltage $+V_{Pc}$ developed by a pulse generator and voltage switch circuit 32 which is similar to the circuit 32 shown in FIGURE 5, but with this one difference, terminal 58 and negative D.C. voltage $-V_h$ are not provided, resistors 116, 117 being omitted, or, alternatively, resistors 116, 117 employed and terminal 58 connected to the common power return 40. The cathode gate circuit is also connected to the logic input $V_{li}$ at terminal 72. The anode circuit is connected to the logic output $V_{lo}$ at terminal 133, the phase controlled, full wave rectified, unfiltered lamp intensity control signal $V_p$ at terminal 121, and the switched voltage common buss voltage $V_S$ from the pulse generator and voltage switch circuit at terminal 57. The mode of the lamp power handling solid state device 69 is connected to the lamp buss common voltage $+V_L$. The source of voltage $V_L$ may be the full wave rectified, unfiltered voltage obtained from the power supply circuit of FIGURE 10 at terminal 63. Alternatively, a full wave, unrectified voltage, or half wave rectified, unfiltered voltage may be employed or any such wave-shaped voltages providing commutation for device 69. The lamp intensity signal $+V_p$ is in the logic portion of the circuit of FIGURE 11 and thus is operable at a lower level than in the FIGURE 6 circuit.

The logic transfer circuit of FIGURE 11 operates in substantially the same manner as the logic transfer circuits 37 of FIGURE 5. Thus, the charge on capacitor 74 determines whether or not switch 131 conducts, and this capacitor charge is determined by the state (conductive or nonconductive) of the silicon controlled switch 130 of the immediately previous stage. As in the case of the logic transfer circuit of FIGURE 5, the presence of pulse common buss voltage $+V_{Pc}$ and conductive state of the previous stage causes switch 130 to conduct, thereby passing the lamp intensity control signal $+V_p$ through diode 140 to the gate of solid state device 69 to cause conduction thereof, and illumination of lamp 66. If the previous stage is nonconductive, switch 130 remains nonconductive since capacitor 74 maintains its charge during the short duration of pulse $V_{Pc}$ as in the case of the FIGURE 5 circuit. The nonconduction of switch 130 maintains the anode thereof at switched voltage $V_s$ whereby diode 141 is in a blocked condition to prevent the state of the logic output $V_{Lo}$ at terminal 133 from changing. The logic transfer circuits of FIGURES 5 and 11 have the advantage of not losing information content (logic) for substantial loss of power supply voltage, which could frequently occur during switching surges associated with utility service. This advantage comes about by proper selection of the circuit elements. An advantage of the circuit of FIGURE 11 over the similar circuit in FIGURE 5 is the increased sign reliability obtained in that failure in the lamp power circuit does not destroy the sign logic. It should be noted that in the circuit of FIGURE 5, diode 71 permits continued logic operation of the circuit under wide voltage conditions, as experienced in lamp dimming operation, and wide impedance changes including open circuit (lamp failure). Further advantages of the FIGURE 11 circuit over that of FIGURE 5 are, decrease of power loss due to absence of diode 71, substantial reduction in power loss in the resistors associated with device 130, and reduced sign of capacitor 74 as a result of the increased sensitivity of device 130 over that of devices 67, 68 or 69. Full utilization of the device 130 capabilities eliminates any difficulty caused by voltage transients which might cause false operation. The FIGURE 5 circuit, of course, has the advantage of utilizing fewer elements than the corresponding FIGURE 11 circuit.

From the foregoing description, it can be appreciated that our invention makes available a new dynamic optical electrical display sign wherein the subject matter optically presented on the sign may be of the moving or nonmoving type, and electronic circuitry employing solid state devices is utilized to control the display. The use of the solid state circuitry eliminates all of the moving parts with the exception of the tape reader or its equivalent that are utilized in present electro-mechanical control units. The virtually no-moving parts display sign obtains a more reliable sign due to improved lamp life and the decrease of frequency of repair and resultant nonoperating time of the sign. The solid state devices also permit the use of logic transfer circuits which result in the use of a very small number of electrical conductors for interconnecting the display sign proper with the remote controller therefor. The use of the solid state devices also permits use of solid state circuitry which obtains modes of sign operation, such as the stretching and compression effect, variation in speed of travel, and variation in light intensity that are not readily duplicated with electro-mechanical components.

Having described a general and specific embodiment of our apparatus, it is believed obvious that modification and variation of our invention is possible in the light of the above teachings. Thus, the minimum number of electrical conductors interconnecting the display sign proper and the remote controller, which is one of the features of our invention, can be decreased further by employing multiplexing techniques, and can be reduced to zero by employing wireless or radio frequency techniques. The use of a minimum number of interconnecting conductors substantially reduces sign installation costs. The modular construction of the sign permits changing of the total length of the sign by the simple expedient of adding or subtracting modules. The display obtained on our sign is uniform and does not waver or flicker as do the electromechanical signs due to nonsynchronous operation of the mechanical switches employed therein. The switch contacts of most electro-mechanical signs are limited in their electrical power handling capability due to arcing whereas our solid state controlled sign is limited in power rating only by the availability of appropriately-rated solid state devices. Further, our invention is not limited to display signs, but may be employed in other types of display such as department store window displays, traffic control signs, race track tote board, athletic score board, transportation arrival and departure information board, stock market information, and other applications wherein a particular sequence of lamp illumination is obtained in response to a predetermined fixed program (a tape or card program), a real time input (a manually operated keyboard), or a sensor and/or a clock (scoreboard, time-temperature sign). Finally, the master clock circuit 43 and lamp intensity control circuit 26 may be controlled by the same recording medium containing the logic, the decoder-encoder 41 in such case supplying the appropriate control signals to the respective circuits. It is, therefore, to be understood that changes may be made in the particular embodiments as described which are within the full intended scope of the invention as defined by the following claims.

What we claim as new and desire to secure by Letters Patent of the United States is:

1. An illuminated display comprising:
   at least one display section, each said display section comprising:
      a predetermined number of lamps disposed in a desired arrangement of rows and columns on said display section,
      a plurality of solid state controlled conducting devices connected in circuit relationship with said lamps,
   lamp control circuit means connected in circuit relationship with said solid state devices for controlling conduction and nonconduction thereof, said lamp control circuit means comprising:
      a plurality of logic transfer circuits each connected in circuit relationship with an associated one of said solid state devices for controlling conduction thereof in a desired sequence and thereby controlling illumination of the associated lamp in the same sequence, the logic transfer circuits associated with each row of lamps being connected in series circuit relationship to form shift register circuits of number equal to the number of rows of lamps,
      a logic switching circuit connected in circuit relationship with each of said logic transfer circuits for switching the controlled conduction states of the solid state devices associated with each column of lamps to the solid state devices associated with the next successive column of lamps,
   remote controller means for controlling the illumination of said lamps in a desired sequence, said remote controller means comprising:
      a clock circuit for generating pulses of electrical energy at a substantially constant frequency, said clock circuit connected in circuit relationship with said logic switching circuit whereby the generated pulses initiate operation thereof to cause the switching at a speed proportional to the frequency of pulse generation,
      an information circuit for generating logic output in electrical pulse form corresponding to the desired sequence of lamp illumination, said information circuit connected in circuit relationship with the logic transfer circuits associated with the first column of said lamps, said information circuit connected in circuit relationship with said clock circuit and actuated by the pulses generated thereby, and
      a power supply circuit for supplying electrical power to said lamps, said power supply circuit connected in circuit relationship with said solid state devices and said lamps whereby conduction of selected of said solid state devices as determined by the logic generated by said information circuit supplies electrical power to corresponding selected lamps to cause illumination thereof.

2. An illuminated display sign comprising:
   a display panel,
   a predetermined number of lamps mounted in a desired arrangement of rows and columns on said display panel,
   a plurality of solid state controlled conducting devices of number equal to the number of said lamps, each of said lamps connected in circuit relationship with an associated one of said solid state devices,
   a plurality of logic transfer circuits of number equal to the number of said solid state devices, each of said logic transfer circuits connected in circuit relationship with an associated one of said solid state devices for controlling conduction thereof in a desired sequence and thereby controlling illumination of the associated lamp in the same sequence, the logic transfer circuits associated with each row of lamps connected in series circuit relationship to form shift register circuits of number equal to the number of rows of lamps,
   a logic switching circuit connected in circuit relationship with each of said logic transfer circuits for switching the controlled conduction states of the solid state devices associated with each column of lamps to the solid state devices associated with the next successive column of lamps,
   logic circuit means for determining the sequence of controlled conduction of said plurality of solid state devices and thereby determining the control of illumination of said lamps in a desired sequence, said logic circuit means connected in circuit relationship with the logic transfer circuits associated with the first column of said lamps, and
   a clock circuit for generating pulses of electrical energy at a substantially constant frequency, said clock circuit connected in circuit relationship with said logic switching circuit whereby the generated pulses initiate operation thereof to cause the switching at a speed proportional to the frequency of pulse generation.

3. An illuminated traveling message display sign comprising:
   a display panel,
   a predetermined number of lamps mounted in a desired arrangement of rows and columns on said display panel,
   a plurality of solid state controlled conducting devices, at least one each of said lamps connected in circuit relationship with an associated one of said solid state devices,
   a plurality of logic transfer circuits mounted on said display panel, each of said logic transfer circuits connected in circuit relationship with an associated one of said solid state devices for controlling the conduction thereof and thereby controlling illumination of the associated lamp, the logic transfer circuits associated with each row of lamps being connected in series circuit relationship to form respective shift register circuits,
   a logic switching circuit mounted on said display panel and having a first output thereof common to said plurality of logic transfer circuits to thereby cause all of said lamps to be deenergized simultaneously, and a second output thereof to actuate each shift register circuit to cause switching of the controlled conduction states of the solid state devices associated with each column of lamps to the solid state devices associated with the next successive column of lamps, logic circuit means for determining the sequence of controlled conduction states of said plurality of solid state devices and thereby determining the control of illumination of said lamps in a desired sequence to obtain a display of selected characters on said display panel, said logic circuit means adapted to generate logic in electrical pulse form corresponding to the desired sequence of lamp illumination, output of said logic circuit means connected in circuit relationship with the logic transfer circuits associated with the first column of lamps, a clock circuit for generating pulses of electrical energy at a substantially constant frequency which determines the speed of character travel across said display panel, said clock circuit connected in circuit relationship with said logic circuit means and said logic switching circuit for supplying the clock pulses thereto and thereby initiating the sequential operation thereof, and a power supply circuit connected in circuit relationship with said solid state devices and said lamps whereby conduction of selected of said solid state devices as determined by said logic circuit means supplies electrical power to the associated lamps to control illumination thereof and thereby provide a message comprising the selected characters traveling across said display panel.

4. The illuminated traveling message display sign set forth in claim 3 and further comprising:
means for varying the width of characters presented on said display panel.

5. The illuminated traveling message display sign set forth in claim 3 and further comprising:
means for varying the speed of character travel across said display panel.

6. The illuminated traveling message display sign set forth in claim 4 wherein said character width varying means comprises:
circuit means connected to an output of said clock circuit for varying the frequency of the generated clock pulses by a predetermined ratio output of said clock circuit connected to said logic circuit means, output of said clock circuit and output of the latter circuit means adapted to be alternately connected to said logic switching circuit whereby the width of the characters presented on said display panel is of a first predetermined width when said logic switching circuit is connected to the output of said clock circuit and the character width is varied from the first predeterminer width when said logic switching circuit is connected to said latter circuit means.

7. The illuminated traveling message display sign set forth in claim 4 wherein said character width varying means comprises:
circuit means connected to an output of said clock circuit for varying the frequency of the generated clock pulses by a predetermined ratio, output of said clock circuit connected to said logic circuit means, output of said clock circuit and output of the latter circuit means adapted to be alternately connected to said logic switching circuit whereby the width of the characters presented on said display panel is of a first predetermined width when said logic switching circuit is connected to the output of said clock circuit and the character width is varied from the first predetermined width when said logic switching circuit is connected to said latter circuit means, and adjustable means connected in said clock circuit for varying the duration of the generated clock pulses.

8. The illuminated traveling message display sign set forth in claim 5 wherein said character speed varying means comprises:
adjustable means connected in said clock circuit for varying the frequency of the generated clock pulses supplied concurrently to said logic circuit means and said logic switching circuit and thereby varying the speed of character travel across said display panel.

9. The illuminated traveling message display sign set forth in claim 3 and further comprising:
means for varying the light intensity of the illuminated lamps.

10. The illuminated traveling message display sign set forth in claim 9 wherein said light intensity varying means comprises:
a phase control circuit having an output common to said plurality of logic transfer circuits for providing a phase controlled signal thereto which determines the average amount of electrical power supplied to said lamps.

11. The illuminated traveling message display sign set forth in claim 9 wherein said light intensity varying means comprises:
a phase control circuit providing a phase controlled signal to said power supply circuit whereby said power supply circuit supplies a phase controlled voltage common to all of said lamps for determining the average amount of electrical power supplied to said lamps.

12. An illuminated display sign comprising:
a display panel,
a predetermined number of lamps mounted in a desired arrangement of rows and columns on said display panel,
a clock circuit for generating pulses of voltage at a substantially constant frequency,
logic circuit means adapted to generate logic in electrical pulse form corresponding to a desired sequence of lamp illumination on the display panel, said logic circuit means connected in circuit relationship with said clock circuit for obtaining synchronous operation therewith,
a power supply circuit for generating a full wave rectified unifiltered voltage, a direct current voltage, and a lamp buss voltage,
a logic switching circuit connected in circuit relationship with said power supply circuit and said clock circuit whereby said logic switching circuit is supplied with the full wave rectified unfiltered voltage and the direct current voltage generated by said power supply circuit and the clock circuit pulses, said logic switching circuit responsive to the concurrent condition of a clock pulse and a zero crossing of the full wave rectified unfiltered voltage to periodically switch the direct current voltage to a switched voltage common buss, said logic switching circuit responsive to the periodic switching of voltage on the switched voltage common buss to thereby generate a relatively short duration pulse of voltage supplied to a pulse common buss,
a plurality of serially connected logic transfer circuits, each serially connected group of logic transfer circuits associated with a particular row of lamps on the display panel, each said logic transfer circuit comprising:
a solid state controlled conducting device connected in series circuit relationship with at least one of said lamps, said series circuit connected to a common lamp buss supplied with the lamp buss voltage generated by said power supply circuit, and
means for controlling the conduction of said solid state device in accordance with the logic state of the immediately preceding serially connected logic transfer circuit, said conduction controlling means including a capacitor connected in circuit relationship with said solid state device wherein the state of charge on said capacitor determines the particular resulting conductive state of said solid state device upon generation of the short duration pulse of voltage, said capacitor operatively connected to a terminal supplied with a logic input signal wherein the logic input signal is the voltage across the solid state device associated with the immediately preceding logic transfer circuit and provides the charge on said capacitor, said capacitor further operatively connected to the pulse common buss by means of a blocking diode, the frequency of clock circuit pulses determining the frequency of voltage switching on the switched voltage common buss and thereby determining the speed of logic transfer occurring during the interval of the short duration pulse of voltage.

References Cited

UNITED STATES PATENTS

| | | | |
|---|---|---|---|
| 2,454,238 | 11/1948 | Waller et al. | 340—339 |
| 2,807,664 | 9/1957 | Kleinberg et al. | 250—219 |
| 2,817,703 | 12/1957 | Naxon | 340—339 |
| 2,949,538 | 8/1960 | Tomlinson | 340—334 |
| 3,041,597 | 6/1962 | Naxon | 178—17 |
| 3,106,696 | 10/1963 | Foley | 340—154 |
| 3,123,815 | 3/1964 | Naxon | 340—339 |
| 3,166,742 | 1/1965 | Sherwin | 340—324 |
| 3,175,209 | 3/1965 | Bramer | 340—334 |
| 3,225,342 | 12/1965 | Clark | 340—324 |
| 3,290,515 | 12/1966 | Procter | 307—88.5 |

JOHN W. CALDWELL, *Primary Examiner.*

THOMAS B. HABECKER, *Examiner.*

A. J. KASPER, *Assistant Examiner.*